(12) United States Patent
Sieckmann et al.

(10) Patent No.: US 11,971,529 B2
(45) Date of Patent: Apr. 30, 2024

(54) LEARNING AUTOFOCUS

(71) Applicant: LEICA MICROSYSTEMS CMS GMBH, Wetzlar (DE)

(72) Inventors: Frank Sieckmann, Eppingen (DE); Constantin Kappel, Schriesheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 428 days.

(21) Appl. No.: 17/294,692

(22) PCT Filed: Nov. 20, 2019

(86) PCT No.: PCT/EP2019/081916
§ 371 (c)(1),
(2) Date: Oct. 11, 2021

(87) PCT Pub. No.: WO2020/104521
PCT Pub. Date: May 28, 2020

(65) Prior Publication Data
US 2022/0028116 A1    Jan. 27, 2022

(30) Foreign Application Priority Data
Nov. 20, 2018   (DE) ............... 10 2018 219 867.5

(51) Int. Cl.
*G02B 21/24* (2006.01)
*G02B 21/36* (2006.01)
(Continued)

(52) U.S. Cl.
CPC ......... *G02B 21/244* (2013.01); *G02B 21/367* (2013.01); *G06N 3/04* (2013.01);
(Continued)

(58) Field of Classification Search
None
See application file for complete search history.

(56) References Cited

U.S. PATENT DOCUMENTS 4,965,443 A   10/1990   Yamasaki et al.
7,042,639 B1   5/2006   McDowell
(Continued)

FOREIGN PATENT DOCUMENTS

CN        105652429 A      6/2016
DE    102014102080 A1      8/2015
(Continued)

OTHER PUBLICATIONS

Guojin Chen et al: "Research on image autofocus system based on neural network," SPIE—International Society for Optical Engineering. Proceedings, vol. 5253, Sep. 2, 2003 (Sep. 2, 2003), pp. 461-465, XP055666182, US.
(Continued)

*Primary Examiner* — Eileen M Adams
(74) *Attorney, Agent, or Firm* — Leydig, Voit & Mayer, Ltd.

(57) ABSTRACT

A method for determining a focus position includes recording at least one first image, wherein image data of the at least one recorded first image are dependent on at least one first focus position during the recording of the at least one first image. A second focus position is determined based on an analysis of the at least one recorded first image using a trained model. At least one second image is recorded using the second focus position. The at least one first image and the at least one second image contain items of information which are in a context with a training of the trained model.

26 Claims, 5 Drawing Sheets

(51) Int. Cl.
  *G06N 3/04* (2023.01)
  *G06T 7/80* (2017.01)
  *G06V 10/20* (2022.01)
  *G06V 10/44* (2022.01)
  *G06V 10/82* (2022.01)
  *G06V 20/69* (2022.01)

(52) U.S. Cl.
  CPC .............. *G06T 7/80* (2017.01); *G06V 10/255* (2022.01); *G06V 10/454* (2022.01); *G06V 10/82* (2022.01); *G06V 20/693* (2022.01); *G06T 2207/20081* (2013.01); *G06T 2207/20084* (2013.01)

(56) References Cited

U.S. PATENT DOCUMENTS

| | | | | |
|---|---|---|---|---|
| 9,516,237 | B1* | 12/2016 | Goyal | .................. H04N 25/533 |
| 2009/0074393 | A1 | 3/2009 | Park et al. | |
| 2010/0177189 | A1 | 7/2010 | Rughani et al. | |
| 2014/0188856 | A1 | 7/2014 | Jiang | |
| 2017/0353991 | A1 | 12/2017 | Tapia | |
| 2018/0191948 | A1 | 7/2018 | Zheng | |
| 2019/0205622 | A1* | 7/2019 | Hong | ..................... G06V 40/40 |
| 2020/0015894 | A1* | 1/2020 | Bor | ...................... A61B 3/0025 |

FOREIGN PATENT DOCUMENTS

| | | |
|---|---|---|
| JP | H04330411 A | 11/1992 |
| JP | 2016505989 A | 2/2016 |
| JP | 2020060602 A | 4/2020 |
| KR | 100799829 B1 | 1/2008 |

OTHER PUBLICATIONS

Pinkard, Henry et al. "Deep learning for single-shot autofocus microscopy," Optica, vol. 6, No. 6, Jun. 2019, pp. 794-797, The Optical Society, US.

Wu, Yichen et al. "Three-dimensional virtual refocusing of fluorescence microscopy images using deep learning," nature methods, Nov. 4, 2019, pp. 1323-1331, Nature Publishing Group, UK.

* cited by examiner

LEARNING AUTOFOCUS

CROSS-REFERENCE TO PRIOR APPLICATIONS

This application is a U.S. National Phase application under 35 U.S.C. § 371 of International Application No. PCT/EP2019/081916, filed on Nov. 20, 2019, and claims benefit to German Patent Application No. DE 10 2018 219 867.5, filed on Nov. 20, 2018. The International Application was published in German on May 28, 2020, as WO 2020/104521 A2 under PCT Article 21(2).

FIELD

The invention relates to a method and a device for determining a focus position by means of trained models.

BACKGROUND

Visual perception is an important component in the physiology of humans. Items of information from our surroundings can be obtained by optical stimulations in the human eye. The human eye can focus for this purpose on objects in the near field and in the far field. This dynamic adaptation of the refractive power of the eye is also called accommodation. Focusing on objects for a sharp representation of the object is also important in technical imaging methods. The technology of automatically focusing on objects is also referred to as autofocus. However, the prior art displays some disadvantages and problems of existing systems, which are considered hereinafter.

Conventionally operating autofocus systems expect a focal plane to be clearly delimited, so that a single plane is in focus and all parallel planes surrounding it are outside the focus. The outstanding focal plane differs from the planes surrounding it in that only it contains a maximum degree of sharpness. This means that all other parallel planes image an object more fuzzily. This type of focus system has multiple disadvantages. For example, it cannot be used if multiple or all image planes are in the focus. This is the case in confocally operating microscope systems by definition, for example. In confocally operating microscopes, every image plane is in focus, such that the statement "in focus" does not apply. There are no "sharp" and "fuzzy" planes here. A further disadvantage of autofocus systems according to the prior art is that they cannot be adapted to different features of objects. Moreover, scanning ranges, for example the starting and end points of scanning ranges, cannot be defined in microscope recordings.

A further known method for automatic focusing is the laser reflection method. Laser reflection methods presume a clearly measurable reflection, originating from a reference surface, to be able to operate accurately. This type of focus system has the disadvantage that the degree of the optical reflection is dependent on the optical conditions. The use of immersion liquids can reduce the reflection intensity and depress it below a measurable value. An optically precisely adapted transition between objective, immersion liquid, and object carrier would reduce the reflection component R to nearly zero and thus block reflection-based autofocus systems. Moreover, laser reflection methods presume that the object to be examined is always located unchanged at the same distance from the reflection surface. However, this is not the case with moving objects. In the case of living cells, the cell can "travel", for example, such that its distance to the measurable reflection surface is not equidistant. Furthermore, laser reflection methods are dependent on the wavelength used. In particular in confocal systems, the wavelength can have an influence on the signal-to-noise ratio. In addition, it is impossible to establish whether an object is located in a scanning range at all. In reflection methods, an image stack is recorded in each case, even if no object at all which one can scan is located in the scanned range. In the case of large amounts of scans, this means a loss of time and storage space, which can entail high costs.

A further method which is used in autofocus systems is the sectional image method. Sectional image methods have the disadvantage that they cannot be used in microscopy and are only defined on the standard camera technology.

SUMMARY

In an embodiment, the present invention provides a method for determining a focus position. The method includes recording at least one first image, wherein image data of the at least one recorded first image are dependent on at least one first focus position during the recording of the at least one first image. A second focus position is determined based on an analysis of the at least one recorded first image using a trained model. At least one second image is recorded using the second focus position. The at least one first image and the at least one second image contain items of information which are in a context with a training of the trained model.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
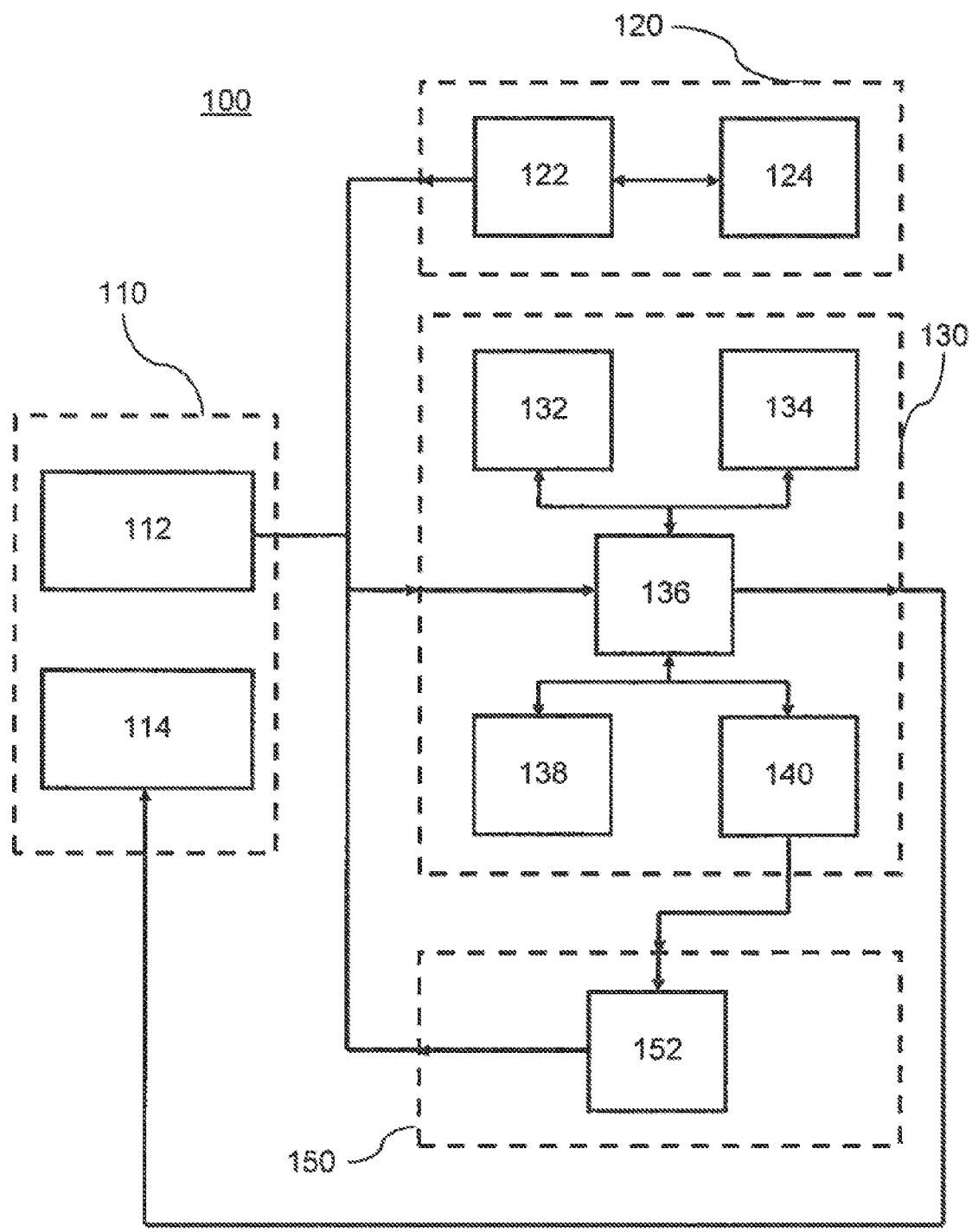
FIG. 1 shows a schematic illustration of a system according to the invention for determining a focus position according to one embodiment.

One problem of all known methods for automatic focusing is that none of them is capable of also making a prediction of an optimum 3D scanning range in addition to a prediction of a suitable focal plane. Moreover, standard methods are often slow and only have limited suitability for methods in which a larger area is scanned. In addition, previous methods cannot differentiate between a plurality of different objects. Therefore, the problem occurs in the prior art that it is not clearly defined which object of a plurality of different objects is to be focused on.

A further disadvantage of known systems is that frequently a larger number of images have to be recorded to find a focal plane. In this case, the light stress of a sample during the focusing can be substantial. If such methods are applied to living cells or living animals, the light stress can thus result in phototoxic effects in such a way that a cell dies or its behavior changes. The autofocus method can thus have a substantial influence on the object to be examined and can thus corrupt measured values if too many images are recorded to determine a focal plane.

Embodiments of the present invention provide to determine a focus position efficiently and rapidly. Embodiments of the present invention solve the problems mentioned and achieve to determine the focus position efficiently and rapidly by way of a method and a device for determining a focus position by means of an analysis of recorded images by a trained model.

The method according to an embodiment of the invention for determining a focus position comprises recording at least one first image, wherein image data of the at least one recorded first image are dependent on at least one first focus position during the recording of the at least one first image, and determining a second focus position based on analysis of the at least one recorded first image by means of a trained model.

The method according to embodiments of the invention and the device according to embodiments of the invention have the advantage that trained models which can be based on neural networks, for example in the meaning of deep learning, can be applied to acquired data to determine a focus position. Deep learning models can make similarly precise or better predictions about the optimal focus like an expert in imaging methods. The model may be applied to a broad spectrum of samples, image recording conditions, and recording modalities and enables a higher accuracy in comparison to autofocus systems from the prior art.

Moreover, the method according to embodiments of the invention and the device according to embodiments of the invention have the advantage that if a single image is used as the input value for the neural network, the focus position can be determined much faster and in a way which is gentler for the sample than is possible in previous image-based focusing systems, which require a plurality of images to find a focus position. Moreover, by means of trained models, it is possible to focus on specific objects in image data which are in a context with a training of the trained model. This enables focusing on an imaged object independently of a location of the object. A further advantage of the method according to embodiments of the invention and the device according to embodiments of the invention is that they can be used in different systems, such as for example confocal microscopes and digital cameras.

The method according to the invention and the device according to the invention can each be further improved by specific embodiments. Individual technical features of the embodiments of the invention described hereinafter can be combined with one another and/or omitted as desired, if the technical effect achieved by the omitted technical feature is not decisive.

In one embodiment, the method can comprise the step of recording at least one second image using the determined second focus position, which is, for example, displaced along an optical axis in relation to the first focus position. This can take place automatically and thus enables a rapid adaptation to special conditions during a measurement and an optimization of a focus position even at a running time of a measurement. The at least one first image can be recorded at a lower resolution than the at least one second image. The speed at which focused images can be recorded may thus be increased.

In one exemplary embodiment, the at least one first image and the at least one second image can contain items of information which are in a context with a training of the trained model. For example, if at least one object is in a context with a training of the trained model, the at least one of one or more objects which are imaged in one or more of the at least one recorded first image can be imaged more sharply in the at least one recorded second image than in the at least one recorded first image. This enables permanent refocusing, and sharp imaging of moving objects over multiple images at a time interval.

In one embodiment of the method, the determination of the second focus position can comprise determining a 3D scanning range. This can be based on items of information, using which the model was trained. For example, the model can have been trained on an object or a sample of a specific size and can determine a focus position and an extension of the object based on the analysis of the at least one first image. The determination of a scanning range enables a rapid execution of experiments in which an object is to be scanned along an axis.

In one embodiment, the method can comprise the step of setting a device, for example a microscope or a digital camera, to the second focus position. The device can comprise an optical system and a sensor, by means of which the setting of the device to the second focus position can be carried out. One embodiment of the method according to the invention can be achieved in that the setting of the device to the second focus position comprises displacing the optical system relative to the sensor. The setting of the device to the second focus position can additionally or alternatively also comprise displacing the optical system and the sensor relative to an object or along an optical axis. The setting of the device can be carried out by a focus drive.

In one or more embodiments of the method according to the invention, the method can comprise the step of acquiring data. This can comprise acquiring a third image. The image data of the acquired third image can be dependent on a user-defined focus position, which was set by a user. The user-defined focus position can deviate from the second focus position, and the acquired data can comprise the acquired third image, and a representation of the deviation from the second focus position to the user-defined focus position and/or a representation of the user-defined focus position. The system can infer due to the acquisition of a user-defined focus position that the user did not agree with the focus position proposed by the trained model. These data can help to continuously improve a trained model, in that they are used for a fine adjustment of the trained model or a training of new models. To obtain sufficient data for a training of a trained model, the acquisition of the data can comprise acquiring an image stack. The image data of each image of the image stack can be dependent on a different focus position, which has a known distance to the user-defined focus position. The distance can correspond to an integer multiple of an axial resolution of an objective used in relation to the user-defined focus position along an optical axis. The acquired third image associated with the user-defined focus position can be marked as a target state for a training which comprises the acquired data.

In one embodiment of the method, the acquired data can comprise metadata. The metadata can comprise items of information on image recording modalities, illumination, a sample, an object, system parameters of a device for acquiring images, image recording parameters, a context, and/or objective parameters. Models may thus be trained which have been trained on specific conditions and can thus provide very precise predictions in comparison to models which were trained on data having a large degree of variability. The trained model for determining a focus position can be selected, for example, from a plurality of models, wherein the plurality of trained models can be classified by an area of use, each of the plurality of trained models was trained in a specific way, the plurality of trained models is hierarchically organized, and/or individual trained models from the plurality of trained models are specialized on individual types of samples, experiments, measurements, or device settings.

In one or more embodiments of the method according to the invention, the method can furthermore comprise the step of adapting the trained model by means of the acquired data. This can be carried out by training a part of the trained model by means of the acquired data, or by retraining the trained model by means of aggregated data, wherein the aggregated data originate from one or more sources and/or comprise the acquired data. The prediction accuracy of trained models, for example deep learning models, may thus be continuously improved, since the method can adapt itself by means of feedback to new conditions and is thus more flexible than methods from the prior art. Because the system improves by "learning" from the user behavior, the accuracy of the autofocus becomes ever higher. In addition, more and more new areas of application are opened up by the continuous improvement of the model. Furthermore, the method becomes increasingly robust in relation to new, previously unseen samples. In contrast to this, previous approaches either had to be so generally valid that they made compromises with regard to accuracy, or they are so specific that they cannot be applied to new sample types or image recording conditions. Therefore, the method according to an embodiment of the invention may be applied to a broad and continuously growing spectrum of samples, image recording conditions, and recording modalities.

In one embodiment of the device according to the invention, the device for determining a focus position can comprise one or more processors and one or more computer-readable storage media. Computer-executable instructions are stored on the storage media which, when they are executed by the one or more processors, cause the above-described method according to an embodiment of the invention to be executed.

In one embodiment, the device according to the invention can be part of an image recording system for setting a focus position. The image recording system can comprise a digital camera (for example a compact camera or a camera for use in manufacturing, in robots, or autonomously acting machines), a computer having a camera, which can also be portable (for example a notebook, a mobile telephone, a smart phone, or a tablet), or a microscope or microscope system. Alternatively, the device can be spatially separated from the image recording system and can be connected via a network to the image recording system. In one exemplary embodiment, the image recording system can comprise at least one sensor, an optical system in order to image one or more objects on one of the at least one sensor, and at least one actuator. The at least one actuator, which can be, for example, a Z drive of a tripod, a Z galvanometer, a piezo focus on an objective of the optical system, a direct drive, a linear motor, a stepping motor, an ultrasonic motor, a ring motor, a micromotor, and a piezo table, can set the image recording system to the second focus position. In embodiments, the at least one actuator can be part of a focusable objective, wherein the focusable objective is based on focus technologies without piezo drive. The image recording system can comprise means which are configured to download trained models from a cloud and/or upload acquired data to the cloud via a network. Models can thus be continuously updated and trained models can be provided quickly. A further embodiment of the image recording system according to the invention which is combinable with the previous ones can comprise a user interface which is configured such that a user-defined focus position can be set and/or input parameters can be acquired by means of the user interface.

The device according to the invention and the method according to the invention can be further improved by further embodiments which are each advantageous as such. Technical features of the individual embodiments can be combined with one another and/or omitted as desired, if the technical effect achieved by the omitted technical feature is not decisive.

The present subject matter of the invention will be described in more detail hereinafter on the basis of exemplary drawings. Examples of advantageous embodiments of the invention are shown in the drawings.

FIG. 1 shows system 100 for determining one or more focus positions for imaging methods. The system 100 comprises a device 110 for acquiring images. The device 110 for acquiring images can comprise a camera, for example a digital camera, a camera installed in a portable computer, for example a smart phone camera, or a microscope, for example a wide-field microscope, a confocal microscope, or a light sheet microscope. The device 110 for acquiring images can comprise one or more sensors 112 and one or more actuators 114. Furthermore, the device 110 can comprise an optical system which consists of at least one of the following optical components: one or more lenses, one or more mirrors, one or more apertures, and one or more prisms, wherein the lenses can comprise various lens types. The optical system can comprise an objective. Moreover, the device 110 can comprise one or more light sources for illumination and/or fluorescence excitation.

The one or more sensors 112 and one or more actuators 114 can receive and/or transmit data. One of the sensors 112 can comprise an image sensor, for example a silicon sensor such as a CCD sensor ("charge-coupled device") or a CMOS sensor ("complementary metal-oxide-semiconductor"), for recording image data, wherein an object can be imaged by means of the optical system on the image sensor. The one or more sensors can acquire image data, preferably in digital form, and metadata. Image data and/or metadata can be used, for example, to predict a focus position. Metadata can comprise data which are in a context with the recording of one or more images, for example image recording modalities such as bright-field illumination, epifluorescence, differential interference contrast or phase contrast, image recording parameters, such as intensity of the light source(s), amplification at the image sensor, sampling rate, and objective parameters, such as the axial resolution of the objective. Image data and metadata can be processed in a device 130, for example a workstation computer, an embedded computer, or a microcomputer, in an image recording device 110.

Even though FIG. 1 delimits the regions 110, 120 and 130 in the schematic illustration, these regions can be part of a single device. Alternatively, in other embodiments they can also comprise two or three devices, which are spatially separated from one another and are connected to one another via a network. In one embodiment, the device 130 can comprise one or more processors 132, a volatile data memory 134, a neural network or trained model 136, a permanent data memory 138, and a network connection 140.

The one or more processors 132 can comprise processing accelerators, such as graphics processing units (GPUs), TensorFlow Processing Units (TPUs), application specific integrated circuits (ASICs) based on machine learning (ML) and/or deep learning (DL), or field programmable gated arrays (FPGAs) or at least one central processing unit (CPU). By means of the one or more processors 132, trained models can be applied for focus determination. The use of trained or predictive models which are used in devices for acquiring images to analyze the acquired images helps to make predictions (inference). The inference comprises a prediction of a dependent variable (called y) on the basis of an independent variable (called X) with the aid of an already previously trained neural network or model. An application machine or device 130, which is not (primarily) used to train neural networks, can also be designed to make predictions based on trained networks. A transfer of a trained neural network to the application machine or the device 130 can be carried out in such a way that the application machine or the device 130 obtains additional "intelligence" due to this transfer. The application machine or the device 130 can thus be made capable of independently achieving a desired object. Particularly inference, which requires orders of magnitude less processing power than the training, thus the development of a model, also functions on typical CPUs. With the aid of the one or more processors 132, in embodiments, models or parts of models can be trained by means of artificial intelligence (AI). The trained models themselves can be executed by the one or more processors. A cognitively expanded device 130 thus results. Cognitively expanded means that the device can be made capable by using neural networks (or deep learning models) or other machine learning methods of semantically recognizing and processing image contents or other data.

Data can be uploaded to a cloud 150 or downloaded from a cloud via the network connection 140. The data can comprise image data, metadata, trained models, the components thereof, or hidden representations of data. The computer 130 can thus load new, improved models from the cloud 150 via the network connection 140. New data can be loaded into the cloud 150 automatically or semiautomatically to improve models. In one embodiment, overwriting of a focus position predicted by the neural network is acquired. New value pairs, such as image data and a focus position, which corresponds to a desired focus position or a target state, can be generated by the overwriting for a training or fine tuning of the neural network 136 or a neural network stored in the cloud. The data thus generated continuously expand the available training data set for a training of models in the cloud 150. A feedback loop thus results between user and manufacturer, by means of which neural networks may be continuously improved for specific applications. The cloud 150 can comprise an AI component 152, by means of which models and/or neural networks can be trained.

Furthermore, the system 100 comprises a user interface 120, which can be part of the device 110, the computer 130, or another device, for example a control computer or a workstation computer. The user interface 120 comprises one or more switching elements 122, for example a focus controller, and a software-implemented user interface 124, via which additional parameters can be input for the neural network 136. This can comprise items of information about a sample type and experimental parameters, such as coloration and culture conditions. In one embodiment, the user can overwrite a result from a neural network and thus contribute to its refinement (fine tuning). The user can input, for example, the focus position which is correct or desired for an intended application.

The neural network 136 can make a prediction based on input values. The input values can comprise image and/or metadata. For example, the neural network 136 can make a prediction about a correct focus position based on input values. The prediction can be used to control at least one of the one or more actuators 114 accordingly. A focus drive can be set as a function of the prediction or the analysis of the input values by means of the neural network. The one or more actuators can comprise a Z drive of the tripod, a Z galvanometer, piezo focus on the objective ("PiFoc"), a direct drive, a linear motor, a stepping motor, an ultrasonic motor, a ring motor, a micromotor, or a piezo table.

The one or more actuators 114 can be set on a predicted plane or focus position. The method for determining a plane or optimum focus position can be repeated as often as desired. One of the sensors 112 can record a refreshed image and the refreshed image can be analyzed by means of the neural network 136. Based on the result, an actuator can set a new position or it can be determined that the optimum position for a focus was achieved. The number of repetitions for determining an optimum focus position can be determined by an abort criterion. For example, the direction reversal of the difference vector between present and predicted focus position can be used as abort criterion.

Figure 2:
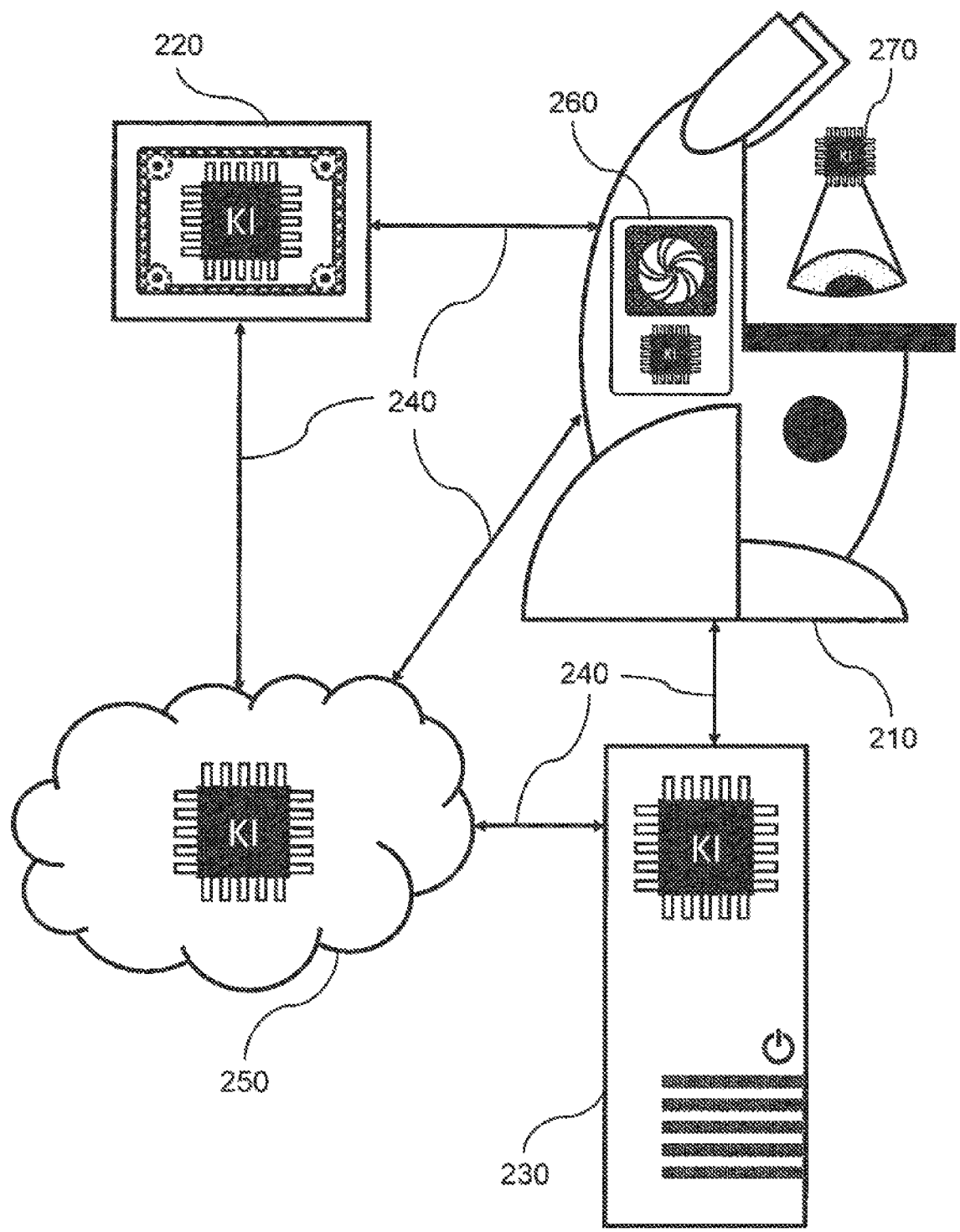
FIG. 2 shows a schematic illustration of a system according to the invention for determining a focus position according to one embodiment.

FIG. 2 shows in one embodiment a communication of an image recording system 210, for example a microscope, with AI-capable devices 220 and 230. A single microscope can itself comprise hardware acceleration and/or a microcomputer, which make it AI-capable and enable the execution of trained models (for example neural networks). Trained models can comprise deep learning result networks. These neural networks can represent results, wherein these were learned by at least one deep learning process and/or at least one deep learning method. These neural networks condense knowledge collected for a specific task ensemble in a suitable manner by automated learning in such a way that a specific task can from then on be carried out automatically and with the highest quality.

The microscope can comprise one or more components 260 and 270. Various components of the microscope, such as actuators 260 and sensors 270, can in turn be AI-capable and can comprise microcomputers or FPGAs. The microscope 210 is designed to communicate with an embedded system 220 and with a control computer 230. In one example, the microscope 210 communicates simultaneously or in parallel with one or more embedded systems 220, which have hardware-accelerated AI (artificial intelligence), and with its control computer 230 via bidirectional communication connections 240. Via the bidirectional communication connections 240, for example a deep learning bus, data (e.g., images, device parameters, experimental parameters, biological data) and models, the components thereof, or hidden representations of data can be exchanged. The models can have been changed during the performance of an experiment (by training or adapting parts of a model). Moreover, new models can be loaded from a cloud 250 onto a microscope or a device and put into use. This can be carried out on the basis of recognition and interpretation of the data, which a model itself has provided, or by an acquisition of user inputs.

For the continuous improvement of models, in one embodiment data of as many users as possible are acquired. The users can specify their preferences of which data can be collected and anonymously processed. Moreover, there can be an option at the correct point in the user interface for the performance of the experiment to assess the prediction of models. In one example, the system could determine a focus position. The user has the option of overwriting this value. The focus position overwritten by the user can represent a new data point for the fine adjustment of a model, which is available for a training of a model. The user thus has the advantage that they can download and/or execute improved models again and again. For the manufacturer, the option opens up in turn of continuously improving their product range, since new models can be developed on the basis of the data of many users.

FIG. 2 furthermore shows the communication of image recording system 210 with embedded computer 220 or system computer 230, which can communicate both among one another and also with a cloud 250 or a server. Image recording system 210 and its attached components can communicate among one another and with workstation computers via a deep learning bus system. Specialized hardware can be used for this purpose and/or a TCP/IP network connection or an equivalent. The deep learning bus system can comprise the following properties:

- Networking of all subsystems, i.e. components of the image recording system, sensors and actuators among one another and with suitable models. These subsystems can be intelligent, i.e. can themselves have neural networks or machine intelligence, or non-intelligent.
- The networking of all subsystems and modules of image recording systems with one or more image recording systems results in a hierarchy structure with domains and subdomains.
- All domains and subdomains and the associated systems and subsystems can be centrally acquired and searchable, in order that a model manager can distribute models thereon.
- Specialized hardware for the bus system can be used for communication in the case of time-critical applications. Alternatively, a network connection according to TCP/IP or a suitable web standard can also be used.
- The bus system preferably manages the following data or a part thereof: ID for each component (actuators, sensors, microscopes, microscope systems, computer resources, workgroups, institutions); rights management with author, institution, write/read rights of the executing machine, desired payment system; metadata from experiments and models; image data; models and their architecture with learned parameters, activations, and hidden representations; required interfaces; required runtime environment with environmental variables, libraries, etc.; all further data as required by the model manager and the rights management.
- A hierarchy structure having domains and subdomains arises due to the plurality of the different AI-capable components. All components are acquired in a directory and findable. Rights management takes place on each level (i.e. component attached to the microscope, microscope/microscope system, workgroup, computer resources, institution). A logical and hierarchical functional structure thus results, which facilitates the cooperation of all actors.

The method according to the invention and the device according to the invention for determining a focus position can be used according to one embodiment in all microscopic recording modalities, in particular wide-field microscopy (with and without fluorescence), confocal microscopy, and light sheet microscopy. All focusing mechanisms used in microscopy and photography come into consideration as focus drives, in particular the Z drive of the tripod, Z galvanometer tables, but also piezo tables or piezo focusing units on the objective ("PiFoc"). Alternatively, the focus drive can comprise an actuator which is part of a focusable objective, wherein the focusable objective is based on focus technologies without piezo drive. Transmitted light illumination, phase contrast, differential interference contrast, and epifluorescence come into consideration as illumination modalities. Various illumination modalities can make it necessary to train a separate neural network for each of them. In this case, an automatic preselection of the suitable model would take place. System parameters (so-called image metadata) can be used for this purpose. Alternatively, a further neural network is used for image classification. This uses the image stack used for the focusing and makes a prediction about the illumination modality, for example transmitted light, phase contrast, etc.

Figure 3:
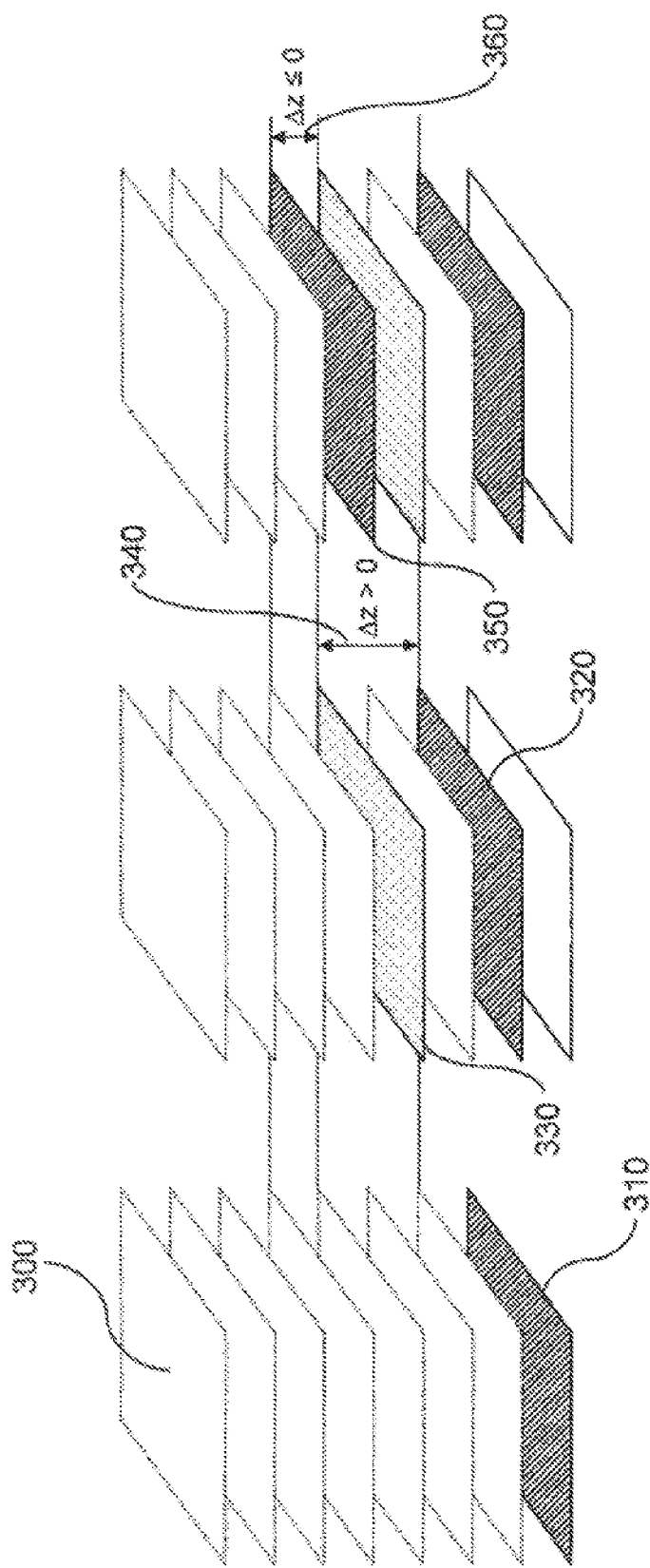
FIG. 3 shows a schematic illustration of a method according to the invention for determining a focus position according to one embodiment.

FIG. 3 shows a schematic illustration of the functionality of determining a focus position according to one embodiment. The method according to an embodiment of the invention can be used for finding a sample plane at the beginning of an experiment.

In a first step, a first image 310 and a second image 320 can be recorded. The images 310 and 320 can be recorded at the distance of the axial resolution of the objective used. The first image 310 and/or the second image 320 are then analyzed by means of a trained model and a prediction 340 is made about a position. The prediction 340 ($\Delta z$, in the case shown $\Delta z > 0$) consists of the difference of the last recorded and/or the analyzed image 320 and the focus position 330 predicted by the model. In one embodiment, this position can be approached using a focus drive. From there, a further image 350 can be recorded at the distance of the axial resolution of the objective used. The further image 350 can then be analyzed once more by means of the trained model to make a further prediction 360 for the newly approached position. If the predicted delta ($\Delta z \leq 0$) of the further prediction 360 is negative, as can be seen in FIG. 3, the correct focus position 330 was already found. Otherwise, the method can be continued until the correct position is found.

The correct position can be checked in both directions of the axial axis. For example, in each case an image can be recorded, for example at the distance of the axial resolution of the objective used or a predefined distance, in the one and the other direction along the optical axis around a predicted position. These can again be analyzed with the aid of the trained model. If the correct position was found, a prediction from one image should supply a positive delta and a prediction from the other image from the opposite direction should supply a negative delta.

In one embodiment, the device according to the invention operates in two different modes. In mode I, a plane in which a sample is visible or in focus is found without action of the user. In mode II, the user can perform a fine adjustment of the focus for his application in order to achieve even more accurate results or a range having a highest information content in the acquired images.

In addition to the fundamental training which can run in a cloud or the development, the model can learn from "experience". The user can determine a focus which is in their opinion optimum and communicate this to the system. In this case, the image stack used for focusing, including metadata (items of information on image recording modalities, illumination, etc.), are transmitted, along with the focus position determined by the user. Both represent new value pairs $X_i$ and $y_i$, which can be added to the training data set. In a further brief round of training ("fine tuning"), the model can improve its prediction accuracy and learn types of samples and illumination modalities. If this takes place at the manufacturer or in the cloud, the user can download a new model. This can take place automatically. In one exemplary embodiment, the user or the device according to the invention can carry out the training for fine tuning themselves. The manufacturer can use a system for managing customer data, which stores user-specific data for the fine tuning. The manufacturer can thus also offer customer-specific neural networks. The manufacturer can use an email, social media, or push messages to inform the user about the availability of new, trained neural networks. The manufacturer can also offer these via an app store to further customers.

In one exemplary embodiment, the consent of a customer can be obtained for storing his image data. Instead of the original image data, a transformation of the data can also be stored. The image data are processed for this purpose by a part of the neural network and transferred into a "feature space". This typically has a lesser dimensionality than the original data and can be considered to be a form of data compression. The original image can be reconstructed by accurate knowledge of the version of the neural network and its parameters.

In one embodiment, a focus position can be determined on the basis of an analysis of only one single image 320. This image 320 can be recorded and a prediction can be made based on an analysis of the recorded image 320 by means of a trained model. This enables a jump prediction to an optimum focus position 330. The system "jumps" directly to the predicted focus position or a position along the optical axis (Z position) without focusing in the conventional sense. The output image used here can be fuzzy, thus can be located outside the focus. In the case of an arbitrary confocal image, which is by definition in "focus", a plane along the optical axis, for example a z plane, having a desired item of information can be predicted. The image used here does not have to contain any of the desired items of information, but the image has to match with a context which is a part of the learning model used.

Expanded applications also result due to the use of a single image. These include the refocusing in time stacks or applications in focus maps. A focus map consists of a set of spatial coordinates in lateral direction (table position) and axial direction (Z drive). Adjacent focus positions in the focus map can be predicted based on one or more focus positions in a focus map. A smaller number of support points in a focus map is thus sufficient to achieve the same accuracy as in previous methods. The focus map can also thus become dynamically variable and increasingly accurate, the more support points are present after a recording progress. In a subsequent step, it can be used to automatically ascertain a curved surface in a 3D space. In the case of large samples, this can be used to acquire the informative spatial elements and thus saves recording time and storage space.

The training model or learning model used can be based on deep learning methods to ascertain the desired jump prediction of the focus position or of a Z plane in the focus (in the case of non-confocal imaging methods), or a plane having the desired information (in the case of confocal imaging methods) on the basis of one or a few images. Conventional image-based methods always have to record and analyze a complete image stack in the axial direction. This is time-consuming and processing-intensive and can damage samples in the case of certain measurements.

The prediction of the optimum focus position can be carried out by a deep convolutional neural network (CNN), which corresponds to a form of deep learning. The model is used in two ways: 1) It "learns" to predict optimal focus positions on the basis of a training data set and 2) It predicts focus positions with an existing image stack or a single image. The first is referred to as supervised training and the latter as inference. The training can take place in a cloud or a computer which is designed for the training of neural networks. The development or the training of the neural networks can take place at a third person or locally. Training can also be carried out automatically by conventional autofocus methods with one or more suitable calibration samples, wherein the one or more calibration samples are adapted to the later intended use, i.e. the type of sample to be examined later. The inference can take place at the user. In one embodiment, however, the user can improve a model or neural network by further, less extensive training. This is referred to as "fine tuning".

Figure 4:
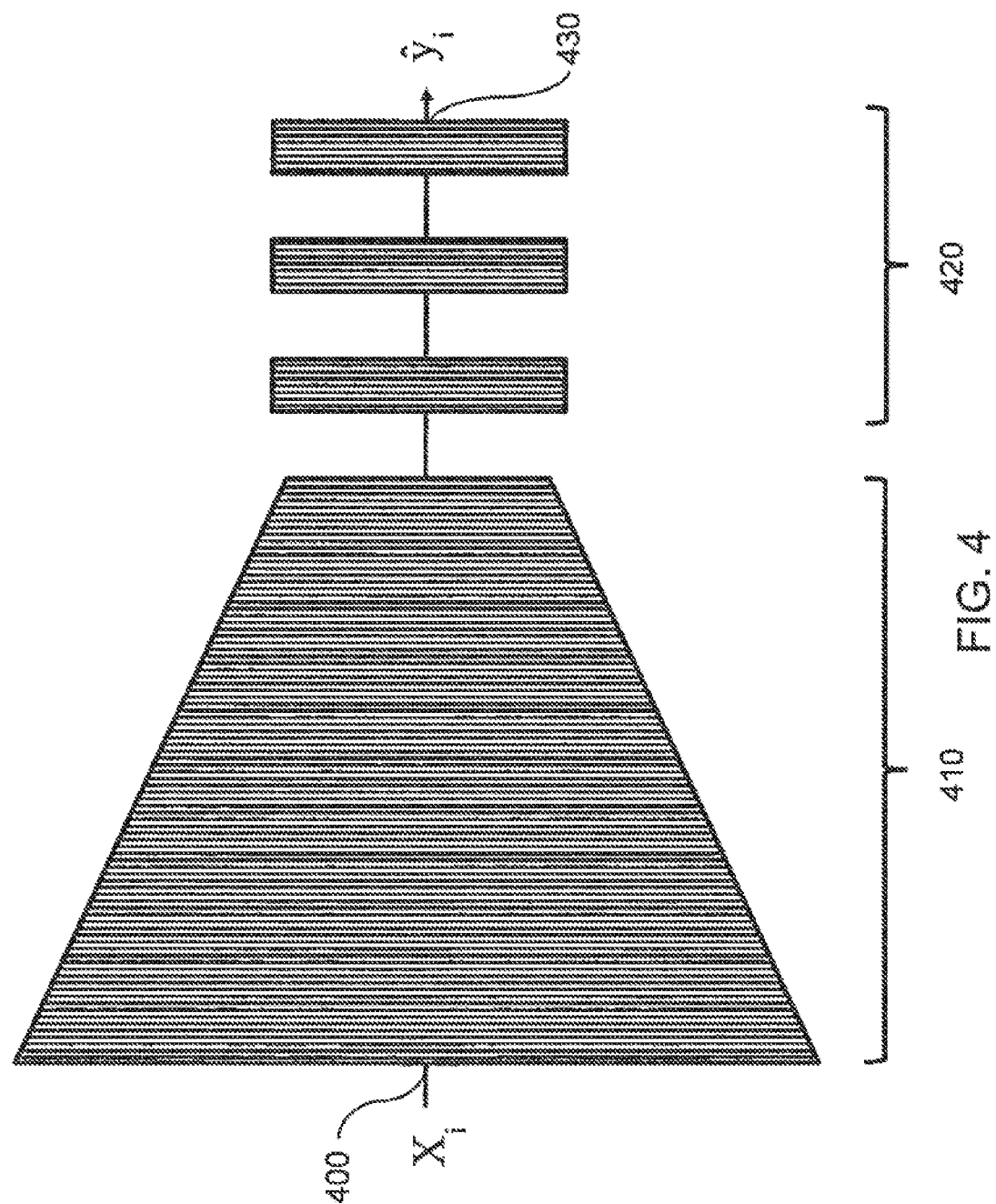
FIG. 4 shows a schematic illustration of a trained model for determining a focus position according to one embodiment.

A schematic illustration of a trained model can be seen in FIG. 4. Data 400 which are input into the model can comprise image data and/or metadata. The trained model can make a prediction 430 about the position of a focus or the distance to the correct focus position from the input data.

The training of a model consists of finding, for existing input values $X_i$, for example image data or metadata, those internal model parameters (for example weights W and/or threshold values B) which result in an optimum prediction of the output values $\hat{y}_i$. The target output values $y_i$ are known for the training. In this application, X, W, and B are to be viewed as tensors, while $\hat{y}_i$ can be a scalar. For example, $\hat{y}_i$ can be the focus position of the Z drive or a value which is related to a focus position and uniquely identifies it (for example a relative distance $\Delta z$ to the current image position). In one exemplary embodiment, as shown in FIG. 3, a prediction can be made based on a Z stack of recorded images. The predicted focus position is relayed to the Z drive of a microscope and the microscope is set accordingly.

The model is composed of two functionally different parts. The first part 410 of the model calculates a pyramidal hierarchically arranged cascade of convolutions each with following nonlinearity and dimension reduction. The parameters for the convolution are learned during the training of the trained model. The model thus "learns" a hidden representation of the data during the training, which hidden representation can be understood as data compression, and also as extraction of image features.

The second part 420 of the model orders and weights the extracted image features. This enables the most accurate possible prediction, for example of a focus position. The training of the image feature extraction 410 is time-consuming and processing-intensive, in contrast to the training of the weighting of the image features 420. This last part of the model can be locally trained with little effort (fine tuning). The fine tuning can be triggered by user inputs of a user and/or automatically. For example, a user can overwrite a focus position predicted by a trained model. If the user overwrites a focus position, it can be presumed that the user is not satisfied with the prediction or that they wish to focus on another region or another object. A further example is that a classical or a second autofocus system automatically finds a focus position which deviates from the focus position predicted by the system. In this case, the second autofocus system can overwrite the predicted focus position. The fine tuning in these and similar cases takes place automatically and improves the prediction accuracy in this application. The individual user can rapidly and locally improve the accuracy of prediction of a trained model by way of the fine tuning. The user can provide their data. Data, for example the overwritten focus position and the associated image data and also metadata, can be uploaded into a cloud via a network connection. Models can be trained and/or improved in the cloud by means of the data. In particular the part for image feature extraction 410 profits therefrom. The trained models in the cloud can be improved by a plurality of users via the cloud. In the cloud, data from various sources or from various users can be aggregated and used for a training.

Models can be trained in the cloud on special applications. If image data having high variability are recorded, models have to be trained very generally. This can result in errors or inaccuracies. One example of image data having a high variability is the use of microscopes in the fundamental research or clinical application, where image data and other data types differ strongly. It can be expedient here to perform an upstream classification step using a "master model" and to select the correct model for the corresponding data domain automatically. This principle of using a hierarchical ensemble of models is not restricted to one data domain, but can comprise different data types and domains. Multiple hierarchically organized model ensembles can also be cascaded to order data domains according to multiple dimensions and to be able to carry out an automatic inference in spite of different applications and variability in the data.

Figure 5:
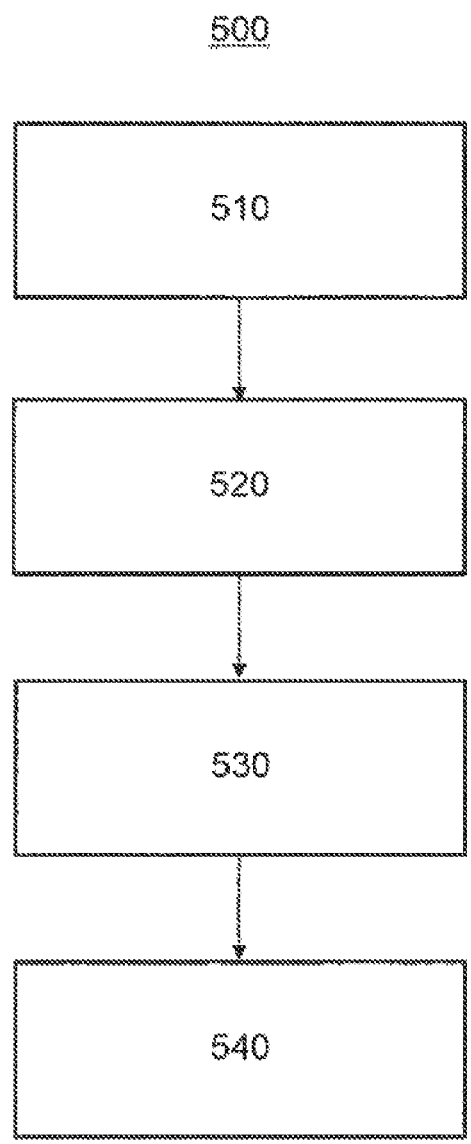
FIG. 5 shows a schematic flow chart of a method according to an embodiment of the invention.

FIG. 5 shows a schematic illustration of a flow chart of a method 500 according to an embodiment of the invention for determining a focus position. The method 500 comprises a first step 510, in which at least one first image is recorded. Image data of the at least one recorded first image are dependent on at least one first focus position during the recording of the at least one first image. The at least one first image can be recorded by means of a device which comprises an optical system and a sensor. In exemplary embodiments, the device for recording images comprises a microscope or microscope system, a digital camera, a smart phone, a tablet, or a computer having a camera. The method according to an embodiment of the invention can especially be used in the field of wide-field microscopy (with and without fluorescence), confocal microscopy, and light sheet microscopy.

In a second step 520, a second focus position is determined. This comprises analyzing the at least one recorded first image by means of a trained model or neural network. The second focus position can then be determined based on the analysis or a prediction from the analysis.

In a third step 530, a device can be set to the second focus position. This can be carried out by means of a focus drive on the device for recording images. Depending on the device, for example an optical system can be displaced relative to a sensor along an optical axis in order to change a focus position and/or to set the device to the determined focus position from step 520. Alternatively, or else additionally, the optical system and the sensor, jointly with constant distance, can also be displaced along an optical axis, such that the focus point is displaced relative to an observed object. For example, a microscope can move a sample table in a direction which corresponds, for example, to the optical axis of the microscope. A desired plane of a sample may thus be brought into the focal plane or the focal plane may be moved into a desired plane of a sample or an object.

A further step 540 can comprise recording at least one second image at the second focus position. Image data of the at least one second image can image one or more objects more sharply than image data of the at least one first image. The method 500 can focus on objects which are in a context with the training or the training data of a neural network or trained model. The method 500 is thus not limited to specific image regions for the focusing. Instead of focusing systems which focus on nearby or large objects, the method 500 can identify objects and focus on them. This can take place independently of the position of an object or the size of an object in the image. In one embodiment, the determination of the focus position is based on the items of information of the image data which are in a context with the training or the training data of a neural network or trained model.

That point of an optical imaging system in which all beams incident in parallel to the optical axis intersect is in the focus. An image which is recorded in the focal plane of an optical imaging system can have the highest contrast structures. A region of highest information can correspond to the focus plane. However, this is not required. The region of highest information is that region desired by the observer of an image in which the observer perceives the (subjectively) highest information for themselves of "something". "Something" in this case means a specific image structure, for example the observer of an image can search for "small green circles with a yellow dot", and then perceive that region of an image which contains this desired structure as the region of highest information.

In one exemplary embodiment, multiple forms of feedback can improve a method and a device for determining a focus position. This can take place during a measurement or recording of images. Two forms of feedback may be differentiated. Both forms of feedback comprise an adaptation of the trained model.

1) Feedback into the model: Since the models can continuously be further finely adjusted ("fine tuning") and their prediction accuracy is thus further increasingly improved, feedback results, which can change and improve the model, which continuously assesses the data, even at the runtime of an experiment or a measurement.

In the feedback, an ensemble of methods or processes can be designed in such a way that results found by means of deep learning feed back to the microscope system, to microscopy subsystems, or other devices for image acquisition in such a way that a type of feedback loop results. The system is asymptotically transferred into an optimum and stable state by the feedback or adapts itself suitably (system settings) to be able to record specific objects more optimally.

In one embodiment, data are acquired to optimize an autofocus method, consisting of steps 510 and 520. The acquisition of these data can trigger the process for optimizing the autofocus method. The acquisition of the data can comprise an acquisition of a third image, wherein the third image can comprise image data which are dependent on a user-defined focus position. The user-defined focus position can deviate here from the second focus position, whereby it can be presumed that a user is not satisfied with the focus position proposed by the trained model and/or an optimization of the autofocus method is required. The user can focus, for example, on a region in the image which contains the highest or most important information for them. The optimization of the autofocus method can thus be achieved by optimizing the trained model.

The acquired data can comprise the acquired third image, and a representation of the deviation from the second focus position from the user-defined focus position and/or a representation of the user-defined focus position. Moreover, the third image can be marked. Since the user-defined focus position corresponds to a desired focus position, the acquired third image associated with the user-defined focus position can be marked as a target state for a training on the basis of the acquired data.

In one embodiment, a user can be actively queried for further data for the optimization of a model. The user can then mark these data. Marking in this case means an assessment of the user in such a way that they communicate to the system which Z position they assess as "in focus" or as "correct" or which focus position sharply images desired objects. In this way, the further data can result due to the operation on the device for recording images and can be used as training data. Images which are assessed by the user as "in focus" receive the label "in focus" here. An image series can then be recorded around this user-defined focus point. An image stack can thus be recorded or acquired in dependence on the acquired data and the user-defined focus position. The image data of each image of the image stack can be dependent on a focus position which has a known distance to the user-defined focus position.

The model used can be finely adjusted based on the acquired data. This can comprise a training of a part of the trained model. For example, only the part 420 from FIG. 4 can be trained. This can be carried out locally by a new selection of internal model parameters. The entire autofocus method can thus be optimized by an optimization of a trained model.

In addition, metadata can also be acquired to classify the acquired data. This enables an area of application to be defined for the trained model. The metadata can comprise items of information on image recording modalities, such as bright-field illumination, epifluorescence, differential interference contrast, or phase contrast, items of information on an illumination, items of information on a sample, items of information on an object, items of information on system parameters of a device for acquiring images, items of information on image recording parameters, such as intensity of the light source(s), amplification at the photosensor, sampling rate, items of context information, and items of information on objective parameters, such as the axial resolution of the objective. Items of context information can be in a context with the acquired data. For example, items of context information can comprise keywords or explanations for an experiment in conjunction with the acquired data and can be used to classify the data.

2) The second form of the feedback is based on image recognition and/or assessment of recorded data. Models can be exchanged and reloaded at the runtime to support other object types, other colorations, and other applications in general. This can even take place during the runtime of an experiment or a measurement, whereby the microscope becomes very dynamic and adaptable. This also includes the case that the sample to be examined itself changes substantially during the experiment, which necessitates an adaptation of the model or the complete replacement of the model during the runtime of the experiment. For example, a "master" or world model can perform a classification of the area of use and select suitable models automatically, which are then executed.

The use and the continuous improvement of predictive models, which are used in the measurements of microscopes or other devices for acquiring images and make predictions there (inference) and can possibly be finely adjusted, advantageously by training only a few nodes in the neural network, optimizes methods for determining focus positions and expands the area of application of models in devices for acquiring images, for example microscopes. Areas of application of the inference by these models are diverse and comprise, for example, the automation of microscopes or of experimental sequences, entirely or partially, for example finding objects and determining or setting an optimum focus position.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

100 system
110 image recording device
112 one or more sensors
114 one or more actuators
120 user interface
122 controller
124 software user interface
130 computer
132 one or more processors
134 one or more volatile storage media
136 neural network
138 one or more storage media
140 network connection
150 cloud
152 AI component
210 microscope
220 embedded computer
230 system computer
240 bidirectional communication connections
250 cloud
260 actuator
270 sensor
300 image stack
310, 320, 350 recorded images
330 correct focus position
340, 360 prediction
400 model input
410, 420 parts of the neural network
430 model output
500 method
510-540 method steps

The invention claimed is:

1. A method for determining a focus position, the method comprising:

recording at least one first image, wherein image data of the at least one recorded first image correspond to at least one first focus position during the recording of the at least one first image;

determining a second focus position based on an analysis of the at least one recorded first image using a trained model; and recording at least one second image using the second focus position, wherein the at least one first image and the at least one second image contain items of information which are in a context with a training of the trained model, and wherein at least one object of one or more objects which are imaged in one or more of the at least one recorded first image are imaged more sharply in the at least one recorded second image than in the at least one recorded first image, wherein the at least one object is in the context with the training of the trained model.

2. The method according to claim 1, wherein the at least one first image is recorded at a lower resolution than the at least one second image.

3. The method according to claim 1, wherein the at least one recorded first image images one or more objects, wherein the at least one recorded second image images at least one of the one or more objects more sharply than the at least one recorded first image.

4. The method according to claim 1, wherein:
trained models are exchanged and reloaded at the runtime of an experiment or a measurement to support other object types, other colorations, and other applications in general, and/or
a master model performs a classification of the area of use and automatically selects suitable models, which are then executed, and/or
trained models are offered in an app store.

5. The method according to claim 1, wherein:
the second focus position is determined during a measurement, and/or
the at least one first focus position is displaced along an optical axis in relation to the second focus position.

6. The method according to claim 1, wherein the at least one first focus position corresponds to at least one first focal plane and the second focus position corresponds to a second focal plane, and wherein the second focal plane approximately corresponds to an object plane.

7. The method according to claim 1, wherein the determination of the second focus position comprises a determination of a three-dimensional (3D) scanning range.

8. The method according to claim 1, further comprising setting a device to the second focus position, wherein the device comprises an optical system and a sensor.

9. The method according to claim 8, wherein:
the setting of the device to the second focus position comprises a displacement of the optical system relative to the sensor, and/or
the setting of the device to the second focus position comprises a displacement of the optical system and the sensor relative to an object.

10. The method according to claim 1, further comprising acquiring data.

11. The method according to claim 10, wherein the acquisition of the data comprises an acquisition of a third image, wherein image data of the acquired third image are dependent on a user-defined focus position, wherein the user-defined focus position deviates from the second focus position, and wherein the data comprise the acquired third image, and a representation of a deviation from the second focus position to the user-defined focus position and/or a representation of the user-defined focus position.

12. The method according to claim 11, wherein:
the acquisition of the data comprises an acquisition of an image stack, wherein the image data of each image of the image stack are dependent on a focus position, which has a known distance to the user-defined focus position, and/or
the acquired third image associated with the user-defined focus position is marked as a target state for a training on the basis of the acquired data.

13. The method according to claim 10, wherein the acquisition of the data comprises an acquisition of metadata, and wherein the metadata comprise at least one of the following: items of information on image recording modalities, items of information on an illumination, items of information on a sample, items of information on an object, items of information on system parameters of a device for acquiring images, items of information on image recording parameters, items of context information, and items of information on objective parameters.

14. The method according to claim 10, further comprising adapting the trained model using the acquired data.

15. The method according to claim 14, wherein the step of adapting the trained model comprises at least one of the following steps:
training a part of the trained model using the acquired data; and
retraining the trained model using aggregated data, wherein the aggregated data originate from one or more sources and/or comprise the acquired data.

16. The method according to claim 1, wherein:
the trained model is based on one or more neural networks or one or more deep learning result networks; and/or
the trained model was selected from a plurality of models, wherein:
the plurality of trained models is classified by an area of use,
each of the plurality of trained models was trained in a specific way,
the plurality of trained models is hierarchically organized, and/or
individual trained models from the plurality of trained models are specialized for individual types of samples, experiments, measurements, or device settings.

17. A device for determining a focus position, the device comprising:
one or more processors; and
one or more computer-readable storage media, on which computer-executable instructions are stored which, upon being executed by the one or more processors, provide for execution of the following steps:
at least one sensor acquires at least one first image, wherein image data of the at least one acquired first image correspond to at least one first focus position during the acquisition of the at least one first image;
a second focus position is determined, wherein the second focus position is determined based on an analysis of the at least one acquired first image using a trained model; and
at least one second image is recorded using the second focus position,
wherein the at least one first image and the at least one second image contain items of information which are in a context with a training of the trained model, and wherein at least one object of one or more objects which are imaged in one or more of the at least one recorded first image is imaged more sharply in the at least one recorded second image than in the at least one recorded first image, wherein the at least one object is in the context with the training of the trained model.

18. The device according to claim 17, wherein the computer-executable instructions, upon being executed by the one or more processes, further provide that, based on an acquisition of a setting on a user-defined focus position, further data are acquired, wherein the further data comprise image data in dependence on the user-defined focus position, and a representation of the deviation from the second focus position to the user-defined focus position and/or a representation of the user-defined focus position.

19. The device according to claim 18, wherein the acquisition of the further data comprises an acquisition of an image stack, wherein image data of each image of the image stack are dependent on focus positions, which are offset at a distance of an axial resolution of an objective used in relation to the user-defined focus position along an optical axis, and/or the image data acquired in dependence on the user-defined focus position are marked as a target state, wherein the acquired data are used for a training of the trained model.

20. The device according to claim 18, wherein the computer-executable instructions, upon being executed by the one or more processors, further provide that the trained model is adapted, wherein the adapting of the trained model comprises at least one of the following:
    training a part of the trained model using the further data; and
    retraining the trained model using aggregated data, wherein the aggregated data originate from one or more sources and/or comprise the further data.

21. An image recording system for setting a focus position, the image recording system comprising:
    the device according to claim 17;
    the at least one sensor;
    an optical system configured to image one or more objects on the at least one sensor; and
    at least one actuator configured to set the image recording system on the second focus position.

22. The image recording system according to claim 21, wherein:
    the at least one actuator comprises at least one of the following: a Z drive of a tripod, a Z galvanometer, a piezo focus on an objective of the optical system, a direct drive, a linear motor, a stepping motor, an ultrasonic motor, a ring motor, a micromotor, and a piezo table, and/or
    wherein the at least one actuator is part of a focusable objective, and wherein the focusable objective is based on focus technologies without piezo drive.

23. The image recording system according to claim 21, wherein the image recording system is configured to download trained models from a cloud and/or to upload acquired data to the cloud via a network.

24. The image recording system according to claim 21, wherein the image recording system furthermore comprises a user interface, which is configured such that a user-defined focus position can be set and/or input parameters can be acquired by the user interface.

25. The image recording system according to claim 21, wherein:
    the image recording system comprises a digital camera, a portable computer with a camera, or a microscope or microscope system, and/or
    the device is part of a microscope or microscope system.

26. A device for determining a focus position, the device comprising:
    one or more processors; and
    one or more computer-readable storage media, on which computer-executable instructions are stored which, upon being executed by the one or more processors, provide for execution of the following steps:
        at least one sensor acquires at least one first image, wherein image data of the at least one acquired first image correspond to at least one first focus position during the acquisition of the at least one first image;
        a second focus position is determined, wherein the second focus position is determined based on an analysis of the at least one acquired first image using a trained model; and
        at least one second image is recorded using the second focus position,
    wherein the at least one first image and the at least one second image contain items of information which are in a context with a training of the trained model, and
    wherein based on an acquisition of a setting on a user-defined focus position, further data are acquired, wherein the further data comprise image data corresponding to the user-defined focus position, and a representation of a deviation from the second focus position to the user-defined focus position or a representation of the user-defined focus position.

* * * * *